(12) United States Patent
Torii

(10) Patent No.: US 8,379,097 B2
(45) Date of Patent: *Feb. 19, 2013

(54) IMAGE PROCESSING APPARATUS AND METHOD THEREOF

(75) Inventor: Satoru Torii, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/531,776

(22) Filed: Jun. 25, 2012

(65) Prior Publication Data

US 2012/0262589 A1    Oct. 18, 2012

Related U.S. Application Data

(62) Division of application No. 12/789,676, filed on May 28, 2010, now Pat. No. 8,237,804.

(30) Foreign Application Priority Data

Jun. 18, 2009  (JP) .................. 2009-145825

(51) Int. Cl.
*H04N 5/228* (2006.01)
(52) U.S. Cl. ................ 348/208.4; 348/208.99
(58) Field of Classification Search ........... 348/208.4, 348/208.1
See application file for complete search history.

(56) References Cited

U.S. PATENT DOCUMENTS

| | | | | |
|---|---|---|---|---|
| 5,862,420 | A * | 1/1999 | Akimoto et al. ......... | 396/236 |
| 6,735,383 | B2 | 5/2004 | Imada | |
| 6,784,938 | B1 * | 8/2004 | Kidono et al. ............. | 348/364 |
| 7,580,620 | B2 | 8/2009 | Raskar et al. | |
| 7,664,382 | B2 | 2/2010 | Yamasaki | |
| 8,237,804 | B2 * | 8/2012 | Torii ..................... | 348/208.4 |
| 2002/0097993 | A1 | 7/2002 | Imada | |
| 2005/0062875 | A1 * | 3/2005 | Ojima ..................... | 348/362 |
| 2007/0212044 | A1 | 9/2007 | Yamasaki | |
| 2007/0258706 | A1 * | 11/2007 | Raskar et al. .............. | 396/52 |
| 2009/0179995 | A1 * | 7/2009 | Fukumoto et al. ......... | 348/208.6 |
| 2010/0321510 | A1 * | 12/2010 | Tsutsumi .................. | 348/208.4 |
| 2011/0075020 | A1 * | 3/2011 | Veeraraghavan et al. ..... | 348/367 |

FOREIGN PATENT DOCUMENTS

JP  2002-214657 A  7/2002
JP  2007-243774 A  9/2007

OTHER PUBLICATIONS

Ramesh Raskar, et al., "Coded Exposure Photography: Motion Deblurring using Fluttered Shutter", ACM SIGGRAPH 2006.

* cited by examiner

*Primary Examiner* — Roberto Velez
*Assistant Examiner* — Abdelaaziz Tissire
(74) *Attorney, Agent, or Firm* — Fitzpatrick, Cella, Harper & Scinto

(57) ABSTRACT

Upon correcting blur of image capture data of an image capturing device by coded exposure processing, an exposure time and aperture value, which are set by a photometry unit of the image capturing device according to an object, are input, and the exposure time or aperture value is adjusted based on a ratio of shutter open periods in an opening and closing pattern of a shutter used in the coded exposure processing. Then, a gain adjustment value of the image capture data corresponding to a deficiency of an exposure amount by the adjusted exposure time or aperture value is set, image capture by an image capturing unit of the image capturing device is controlled based on the opening and closing pattern, exposure time, and aperture value.

8 Claims, 13 Drawing Sheets

FIG. 13
| ID | OPENING AND CLOSING PATTERN | OPEN RATIO |
|---|---|---|
| 0x01 | 110001001011001... | 0.5 |
| 0x02 | 110010111011100... | 0.6 |
| 0x03 | 110101101110101... | 0.7 |
| ⋮ | ⋮ | ⋮ |
FIG. 14
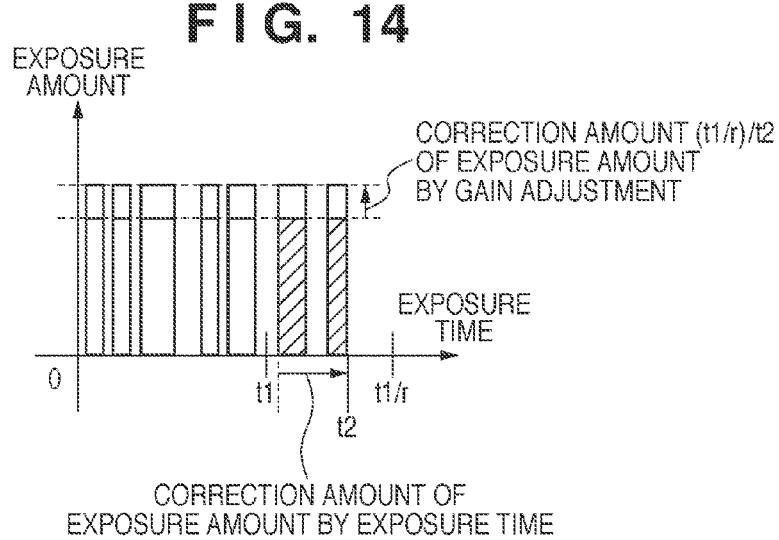
FIG. 15
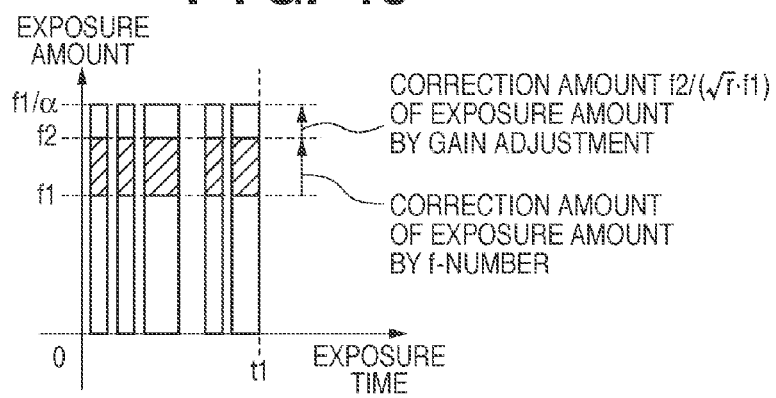

IMAGE PROCESSING APPARATUS AND METHOD THEREOF

This application is a division of application Ser. No. 12/789,676 filed May 28, 2010.

BACKGROUND OF THE INVENTION

1. Field of the Invention

The present invention relates to image stabilization of image capture data.

2. Description of the Related Art

A digital image easily allows enlarged-scale display of over 100% of its original size using a personal computer. In an enlarged image, image blur caused by even a slight camera shake stands out. For this reason, as image capturing devices of digital cameras gain higher resolutions, a process for correcting camera shake at image capture time has received a good deal of attention.

Image stabilization methods include those implemented directly in hardware and those implemented in software. In methods implemented in hardware, a gyro sensor is mounted on a camera, and the influence of camera shake is eliminated by driving a lens and using an image capturing device to cancel vibrations of the camera during exposure based on an output signal from the gyro sensor. An image stabilization method by means of a lens optical system is described in, for example, Japanese Patent Laid-Open No. 2002-214657 (reference 1).

The hardware image stabilization method poses problems related to an increase in the number of components as well as an increase in manufacturing cost. Implementation of a similar function in inexpensive digital cameras demands a software image stabilization method.

As the software image stabilization method, a method of preparing a plurality of images obtained by short exposure (to be referred to as short exposure images hereinafter), and synthesizing these images is available (for example, Japanese Patent Laid-Open No. 2007-243774 (reference 2)). The invention of reference 2 implements image stabilization by correcting the respective deviations of a plurality of images, which are continuously captured each for a short exposure time that permits camera shake, and synthesizing the plurality of deviation-corrected images.

Also, a technique which corrects camera shake by coding a shutter opening and closing pattern, and using the coded opening and closing pattern has been developed. For example, an invention described in Coded Exposure Photography: Motion Deblurring using Fluttered Shutter, ACM SIGGRAPH 2006 (reference 3) is one of such techniques. The invention of reference 3 captures images for randomly coded exposure times, and corrects camera shake using an inverse matrix of the exposure time codes.

Reference 3 corrects image blur due to, for example, camera shake using a technique called coded exposure. Coded exposure is a technique that corrects image blur using a correlation between images obtained by irregularly opening and closing a shutter during a designated exposure time (to be referred to as a fluttered shutter hereinafter), and the shutter opening and closing pattern.

However, an exposure amount (an integral value of exposure amounts during an exposure period) obtained by the fluttered shutter is lower than that obtained when a shutter is open for a proper exposure time, and a captured image becomes dark. Although the brightness of a captured image can be increased by gain adjustment, image quality often degrades due to an increase in noise.

SUMMARY OF THE INVENTION

In one aspect, a method of correcting blur of image capture data of an image capturing device by coded exposure processing, comprising the steps of: inputting an exposure time and an aperture value, which are set by a photometry unit of the image capturing device according to an object; adjusting the exposure time or the aperture value based on a ratio of shutter open periods in an opening and closing pattern of a shutter used in the coded exposure processing; setting a gain adjustment value of the image capture data corresponding to a deficiency of an exposure amount by the adjusted exposure time or aperture value; and controlling image capture by an image capturing unit of the image capturing device based on the opening and closing pattern, the exposure time, and the aperture value.

According to the aspect, deficiency of an exposure amount and an increase in noise in a coded exposure process can be suppressed.

Further features of the present invention will become apparent from the following description of exemplary embodiments with reference to the attached drawings.

BRIEF DESCRIPTION OF THE DRAWINGS

FIG. 13 is a table for explaining an example of an opening and closing pattern list.
FIG. 14 is a graph for explaining adjustment of an exposure amount in an aperture-priority mode.
FIG. 15 is a graph for explaining adjustment of an exposure amount in a shutter-priority mode.

DESCRIPTION OF THE EMBODIMENTS

Image processes according to embodiments of the present invention will be described in detail hereinafter with reference to the drawings. Note that an example in which an arrangement for correcting camera shake is built into a digital camera will be explained hereinafter.

First Embodiment

[Arrangement of Camera]

Figure 1:
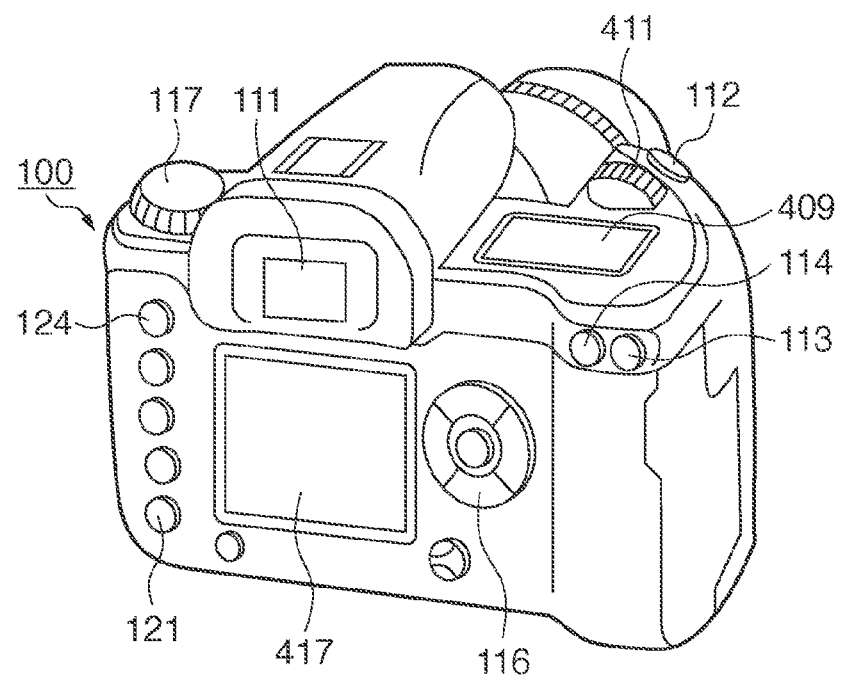
FIG. 1 is a perspective view of a digital camera.

FIG. 1 is a perspective view of a digital camera. A viewfinder eyepiece 111, auto-exposure (AE) lock button 114, button 113 used to select auto-focus (AF) points, and release button 112 used to start an operation of image capture are arranged on the top portion of a camera body 100. Also, an imaging mode selection dial 117, external display unit 409, digital dial 411, and the like are arranged.

The digital dial 411 serves as a multi-function signal input unit which is used to input a numerical value to the camera in cooperation with another operation button and to switch an imaging mode. The external display unit 409 as a liquid crystal display (LCD) panel displays imaging conditions including a shutter speed, stop, and imaging mode, and other kinds of information.

On the back surface of the camera body 100, an LCD monitor 417 which displays an image captured by the camera, various setting screens, and the like, a switch 121 used to turn on/off display of the LCD monitor 417, cross keys 116, a menu button 124, and the like are arranged. Since the LCD monitor 417 is of a transmission type, the user cannot view an image by driving only the LCD monitor 417. For this reason, a backlight is required on the rear surface of the LCD monitor 417, as will be described later.

The cross keys 116 include four buttons arranged at upper, lower, right, and left positions, and a setting button arranged at the center, and are used to instruct the selection and execution of menu items displayed on the LCD monitor 417.

The menu button 124 is used to display a menu screen on the LCD monitor 417. For example, when the user wants to select and set an imaging mode, he or she presses the menu button 124, and then selects a desired imaging mode by operating the upper, lower, right, and left buttons of the cross keys 116. Then, the user presses the setting button while the desired imaging mode is selected, thus completing the setting of the imaging mode. Note that the menu button 124 and cross keys 116 are also used to set an AF mode to be described later.

Figure 2:
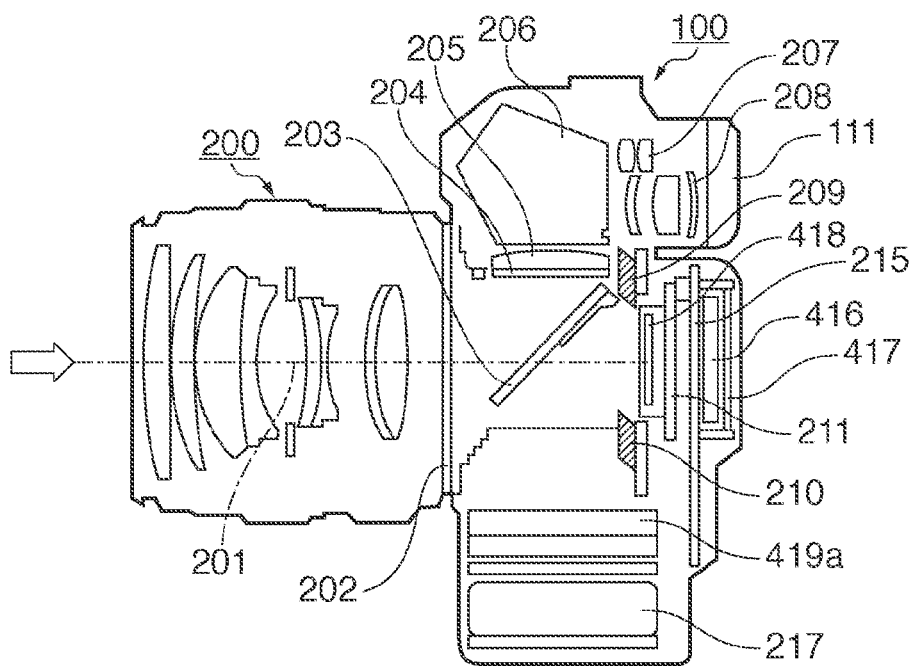
FIG. 2 is a cross-sectional view of the digital camera.

FIG. 2 is a cross-sectional view of the digital camera. An imaging lens 200 of an image optical system is detachable from the camera body 100 via a lens mount 202.

A mirror 203, arranged in an imaging optical path having an imaging optical axis 201 as the center, is allowed to be quickly returned between a position where object light from the imaging lens 200 is guided to a viewfinder optical system (slant position) and an escape position outside the imaging optical path.

Object light guided to the viewfinder optical system by the mirror 203 forms an image on a focusing screen 204. The object light passing through the focusing screen 204 is guided to an eyepiece lens 208 and photometry sensor 207 via a condenser lens 205 and pentagonal roof prism 206, which are required to improve the visibility of a viewfinder.

A first curtain 210 and second curtain 209 form a focal plane shutter (mechanical shutter). By opening and closing the two curtains 209 and 210, an image capturing device 418 such as a charge-coupled device (CCD) or CMOS sensor, which is arranged behind these curtains, is exposed for a required period of time. The image capturing device 418 is held on a printed circuit board 211. Another printed circuit board 215 is arranged behind the printed circuit board 211, and the LCD monitor 417 and a backlight 416 are arranged on the surface, opposite to the board 211, of the printed circuit board 215.

Furthermore, the camera body 100 includes a recording medium 419a used to record image data, and a battery 217 as a portable power supply. Note that the recording medium 419a and battery 217 are detachable from the camera body 100.

Figure 3:
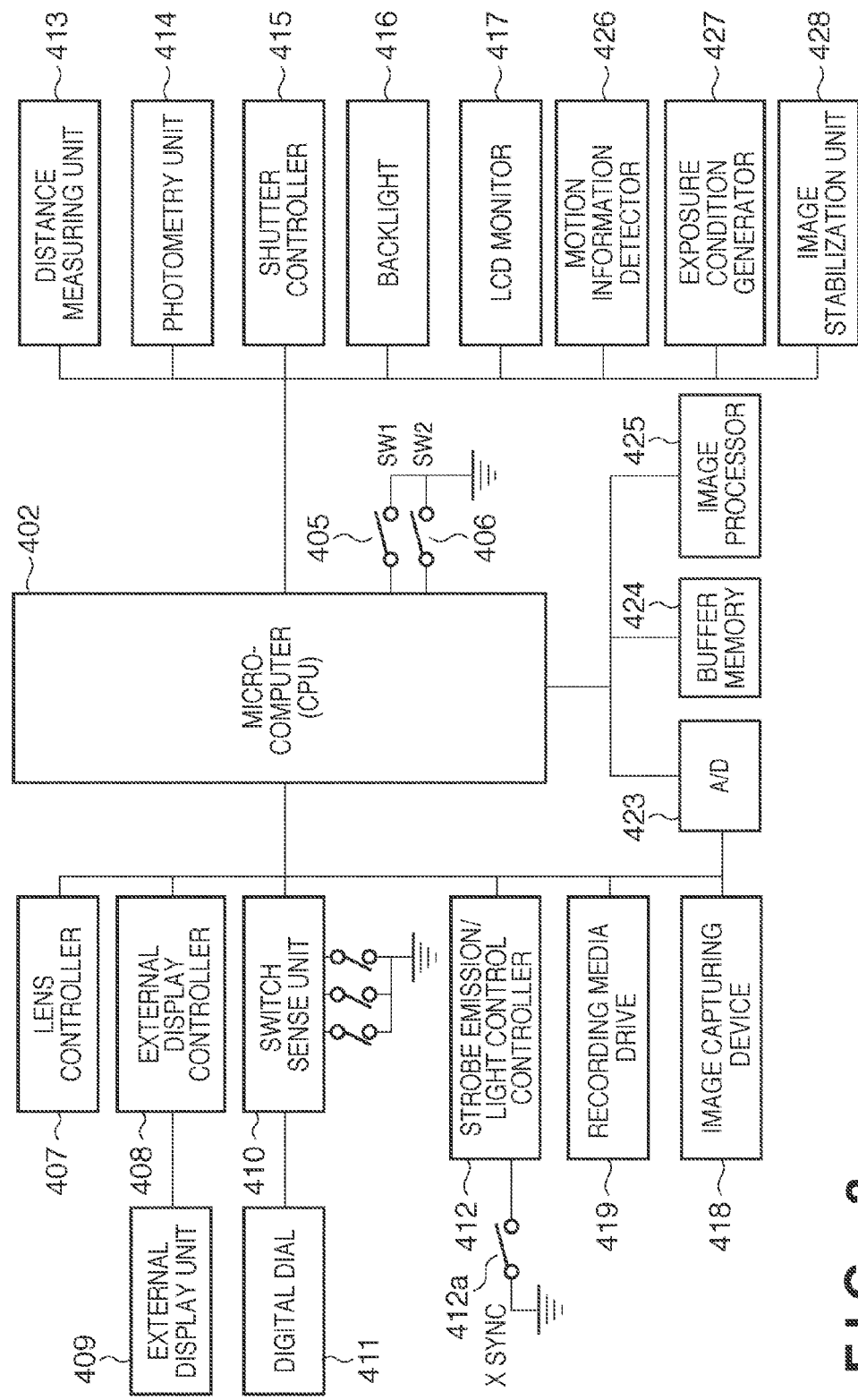
FIG. 3 is a block diagram showing the arrangement associated with control, image capture, and image processes of the digital camera.

FIG. 3 is a block diagram showing the arrangement associated with control, image capture, and image processes of the digital camera. A microcomputer (CPU) 402 controls the operation of the overall camera including the processes of image data output from the image capturing device 418 and display control of the LCD monitor 417.

A switch (SW1) 405 is turned on when the release button 112 is pressed halfway (a halfway pressing state). When the switch (SW1) 405 is turned on, the camera is set in an imaging ready state. A switch (SW2) 406 is turned on when the release button 112 is fully pressed (a full pressing state). When the switch (SW2) 406 is turned on, the camera body 100 starts an operation of image capture.

A lens controller 407 communicates with the imaging lens 200 to execute driving control of the imaging lens 200 and that of an aperture in an AF mode. An external display controller 408 controls the external display unit 409 and a display unit (not shown) inside the viewfinder. A switch sense unit 410 is an interface used to transfer signals output from many switches and keys including the aforementioned digital dial 411 to the CPU 402.

A strobe controller 412 is grounded through an X sync 412a to control light emission and execute light control of an external strobe. the recording medium 419a such as a hard disk or memory card is attached to a recording media drive 419.

A distance measuring unit 413 detects a defocus amount with respect to an object for the purpose of AF control. A photometry unit 414 measures a luminance level of an object to decide an aperture and exposure time. A shutter controller 415 controls the mechanical shutter so as to properly expose the image capturing device 418. The LCD monitor 417 and backlight 416 form a display device, as described above.

An image processor 425 includes a digital signal processor (DSP). A motion information detector 426 detects a camera motion due to, for example, camera shake by a gyro sensor. The output from the motion information detector 426 is used to drive the imaging lens 200 and image capturing device 418 to cancel camera vibrations.

An exposure condition generator 427 generates an exposure condition required to correct image blur due to a vibration, and controls an electronic shutter based on the generated exposure condition, as will be described in detail later. Note that the electronic shutter is controlled by sweep-out pulses and read pulses supplied to the image capturing device 418.

Furthermore, an analog-to-digital converter (A/D) 423, a buffer memory 424 used to buffer image data, and the like are connected to the CPU 402.

[Acquisition of Image Data]

The A/D 423 and image processor 425 process images, which are exposed under the control of the exposure condition generator 427 based on a time period decided by the photometry unit 414, thereby acquiring a plurality of image capture data of an object.

Note that the image capture data is data before demosaicing (developing process) (to be also referred to as RAW data hereinafter), which is obtained by having the A/D 423 convert a signal output from the image capturing device 418 as an image capturing unit into digital data. Note that at least the image capturing device 418 forms the image capturing unit. A combination of the image capturing device 418, A/D 423, and imaging lens 200 is often called an image capturing unit. Alternatively, the camera body 100 is often called an image capturing unit.

An image stabilization unit 428 corrects blur of a captured image due to a vibration using motion information obtained from the motion information detector 426 and a shutter opening and closing pattern. The image processor 425 applies demosaicing to the image capture data corrected by the image stabilization unit 428 to generate image data. Then, the image processor 425 applies various image processes to the generated image data, and stores the image data after the image processes in the recording medium. Note that image capture data before demosaicing may be stored in the recording medium.

[Overview of Coded Exposure Process]

The image stabilization unit 428 corrects image blur due to, for example, camera shake using a coded exposure process. Image blur due to camera shake can be expressed in the form of convolution. Taking camera shake in the vertical direction as an example, a blurred image can be expressed by:

$$I_{blur}(x,y) = 1/T \cdot \int_0^T I(x, y+vt) h(t) dt \quad (1)$$

where $I_{blur}(x, y)$ is a blurred image,

T is an exposure time, v is a vibration velocity,

I(x, y+vt) is an object image, and h(t) is an opening and closing pattern.

The Fourier transformation of equation (1) yields:

$$I_{blur}(u,v) = 1/(vT) \cdot I(u,v) H(u) \quad (2)$$

The transformation of equation (2) yields:

$$I(u,v) = vT/H(u) \cdot I_{blur}(u,v) \quad (3)$$

The inverse Fourier transformation of equation (3) yields:

$$I(x,y) = iFFT\{vT/H(u) \cdot I_{blur}(u,v)\} \quad (4)$$

Since all parameters on the right-hand side of equation (4) are given, a vibration-corrected image I(x, y) can be obtained by equation (4). However, divisions cannot be made for a Fourier transform value H(u)=0 of the opening and closing pattern h(t), thus disabling correction. Hence, the coded exposure process controls the opening and closing pattern h(t) so that the Fourier transform value H(u) of the opening and closing pattern assumes a nonzero value.

The basic sequence of the coded exposure process will be described below taking, as an example, a case in which image blur due to a vibration in a direction of rotation (rotary vibration) is to be corrected. After that, the coded exposure process of this embodiment will be described.

Figure 4:
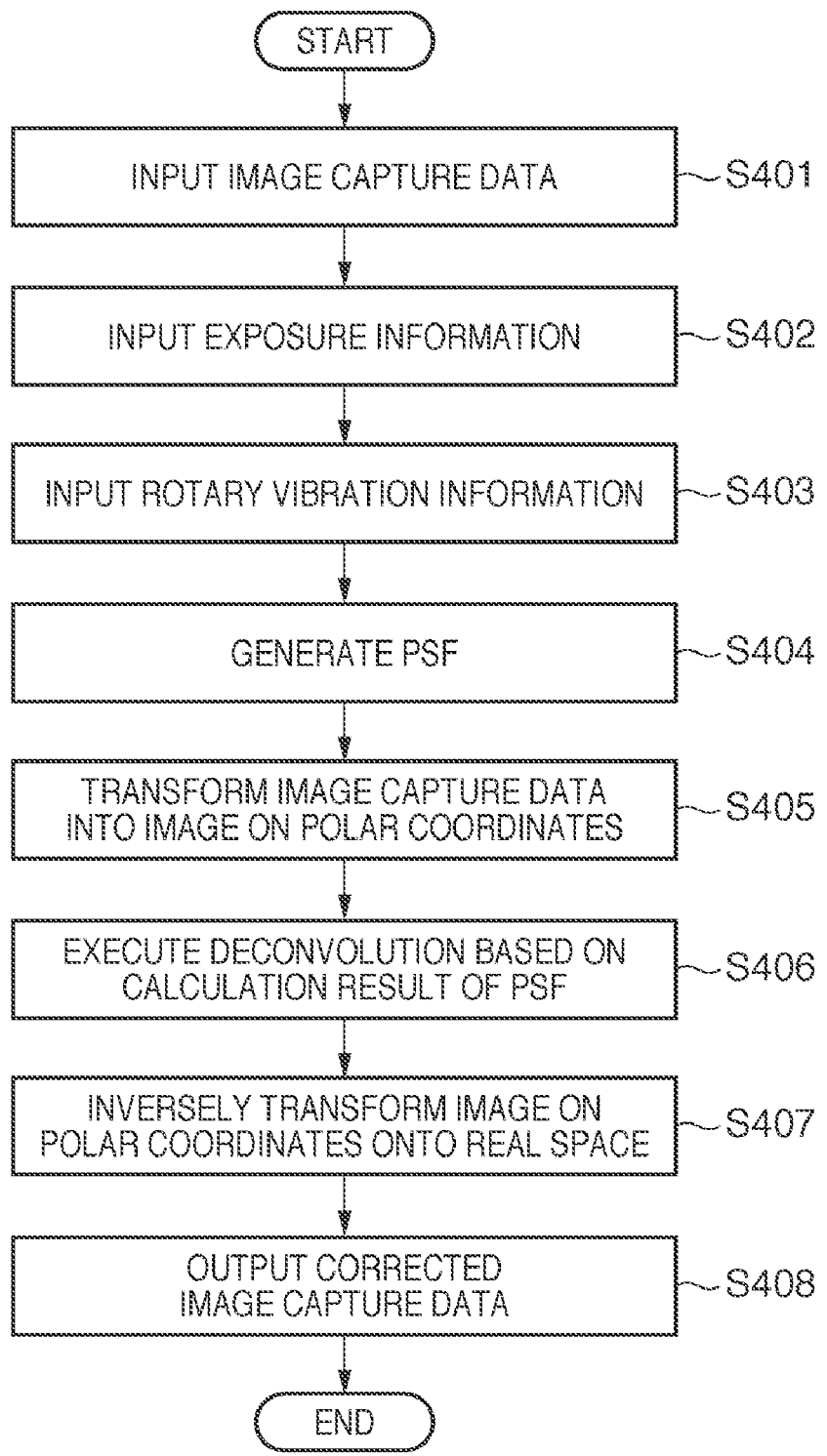
FIG. 4 is a flowchart for explaining a process for correcting image blur by a coded exposure process.

FIG. 4 is a flowchart for explaining a process for correcting image blur by the coded exposure process. Image capture data captured by the fluttered shutter are input (S401). Let I(x, y) be an intensity of light that enters a pixel (x, y) of the image capturing device 418 per unit time, ω(t) be an angular velocity, and T be an exposure time. Since information obtained by rotating I(x, y) through −θ(T−t) enters the camera at time t, image capture data $I_{blur}(x, y)$ is expressed by the following formulas. Note that the origin of the coordinate system is matched with the position coordinates of a rotational center expressed by rotary vibration information (to be described later).

$$I_{blur}(x, y) = 1/T \cdot \int_{t=0}^{T} h(t) I\{x \cdot \cos\theta(T-t) + y \cdot \sin\theta(T-t), \quad (5)$$
$$-x \cdot \sin\theta(T-t) + y \cdot \cos\theta(T-t)\} dt$$

$$= 1/T \cdot \int_{t=0}^{T} h(T-t) I\{x \cdot \cos\theta(t) + y \cdot \sin\theta(t),$$
$$-x \cdot \sin\theta(t) + y \cdot \cos\theta(t)\} dt$$

$$= 1/T \cdot \int_{\omega=0}^{\omega} h(\theta)/\omega(\theta) \cdot I\{x \cdot \cos\theta + y \cdot \sin\theta, \quad (6)$$
$$-x \cdot \sin\theta + y \cdot \cos\theta\} d\theta$$

$$= 1/T \cdot \int_{\omega=0}^{\omega} h'(\theta) \cdot I\{x \cdot \cos\theta + y \cdot \sin\theta, \quad (7)$$
$$-x \cdot \sin\theta + y \cdot \cos\theta\} d\theta$$

where a function h(t) represents an opening and closing pattern: shutter open=1; shutter close=0.

In the modification from formula (5) to formula (6), an integration variable is transformed. θ(t)=dθ/dt. Also, ω(θ) is a function by rewriting h(t) to have θ as a variable using the relationship between t and θ. Likewise, h(θ) is a function by rewriting h(t) to have θ as a variable using the relationship between t and θ. In formula (7), h'(θ)=h(θ)/ω(θ).

Next, exposure information indicating the shutter opening and closing pattern is input (S402), and rotary vibration information indicating the relationship between a vibration angle θ and time is input (S403). Then, as will be described in detail later, h'(θ) as a point spread function (PSF) on polar coordinates is calculated based on the rotary vibration information and exposure information (S404).

Then, the image capture data is transformed into an image on the polar coordinates (S405). As described above, the origin of the orthogonal coordinate system in this transformation is matched with the central coordinates of a rotation indicated by the rotary vibration information. By polar coordinate transformation, formula (7) is transformed into:

$$I_{blur}(r, \Theta) = 1/T \int_{\omega=0}^{\omega} h'(\theta) I(r, \Theta - \theta) d\theta = 1/T \cdot (h'^* I)(r, \Theta) \quad (8)$$

where * represents a convolution operation, and (x, y) in formula (7) is r(cos Θ, sin Θ).

Formula (8) is the same formula as a vibration with respect to translation, and can be considered as that which has undergone convolution by h'(θ) as the PSF. However, formula (8) is a logical formula, and actual data are digital values. Hence, arbitrary interpolation is required to transform a real space into a polar coordinate space. An arbitrary interpolation method can be used. In this embodiment, a bilinear method is used.

As will be described in detail later, deconvolution that cancels the convolution of formula (8) is made based on the calculation result of the PSF (S406). A deconvolution algorithm may use an existing arbitrary algorithm. For example, divisions on a frequency space, a Lucy-Richardson algorithm, an algorithm using a Wiener filter, an algorithm using a normalized filter, and the like are available. In this embodiment, as will be described in detail later, the shape of h'(θ) is controlled by controlling the opening and closing pattern, thus implementing the divisions on the frequency space.

Since I(r, Θ) is obtained by the deconvolution, I(r, Θ) is inversely transformed into a real space indication I(x, y) (S407). This inverse transformation requires an interpolation process as in the transformation from the real space into the polar coordinate space. Then, I(x, y) is output as image capture data after correction (S408).

Figure 5:
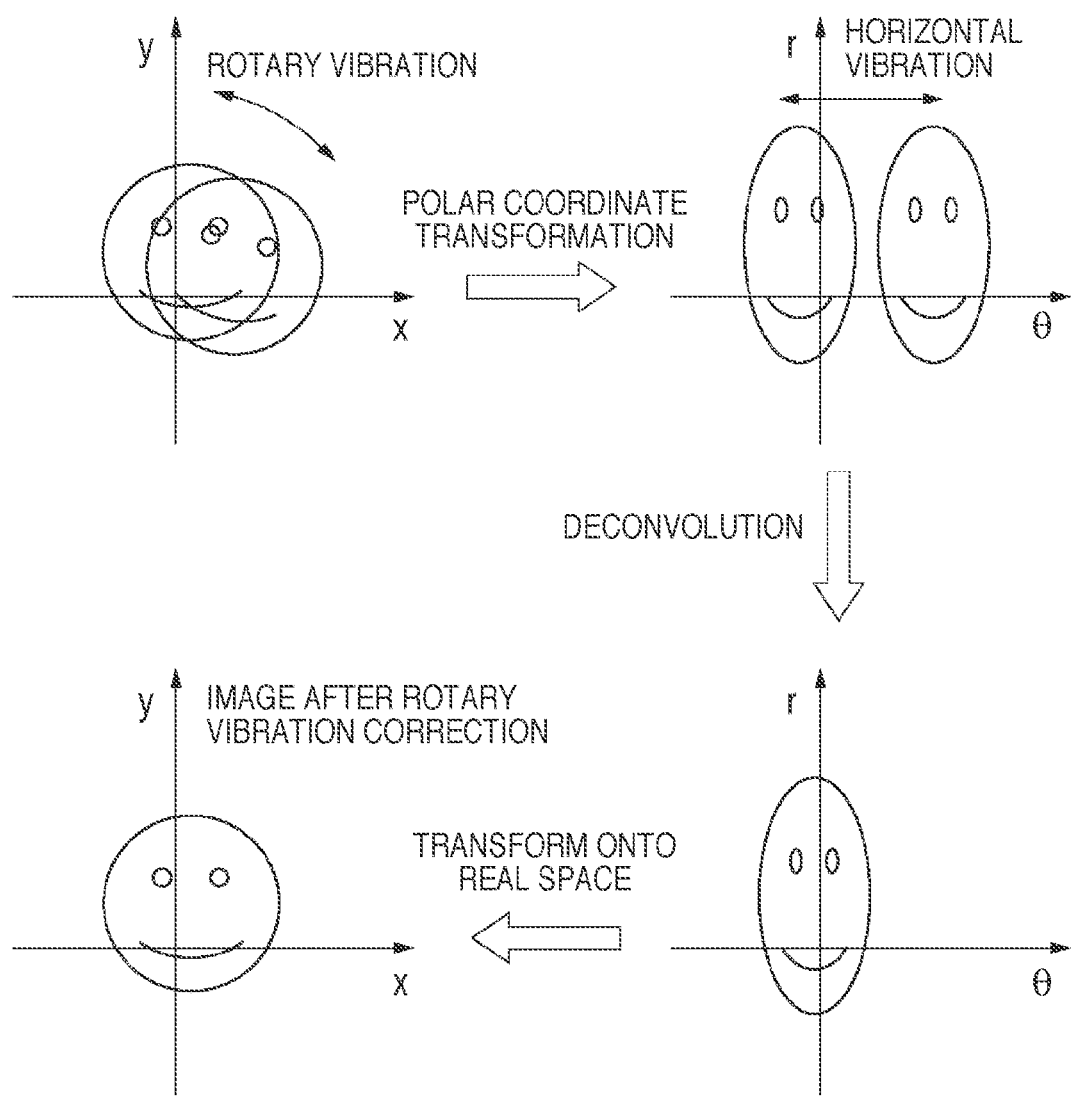
FIG. 5 is a conceptual view showing the correction principle of image blur.

FIG. 5 is a conceptual view showing the correction principle of image blur. That is, a rotary vibration is transformed into a vibration in an angle Θ-axis direction (horizontal vibration) by the polar coordinate transformation, and the horizontal vibration of the image is removed by deconvolution. The image in which the horizontal vibration is removed is inversely transformed into the real space, thus obtaining an image in which the rotary vibration is removed.

In this manner, for images obtained by the fluttered shutter, image blur due to a rotary vibration can be corrected based on the opening and closing pattern (exposure information) of the fluttered shutter and the rotary vibration information. Note that the rotary vibration information can be acquired from the motion information detector 426, and the exposure information can be acquired from the exposure condition generator 427 in this embodiment.

In the description of the above example, since image blur due to a rotary vibration is a correction target, the processes are executed after image capture data is transformed onto polar coordinates. However, by executing the processes without transforming image capture data onto polar coordinates, blur due to a vibration in the horizontal direction (horizontal vibration) and that in the vertical direction (vertical vibration), which are so-called shift vibrations, can also be corrected. For example, blur due to shift vibrations may be corrected before transformation onto polar coordinates, and blur due to a rotary vibration may then be corrected.

●PSF Generation Method

Figure 6:
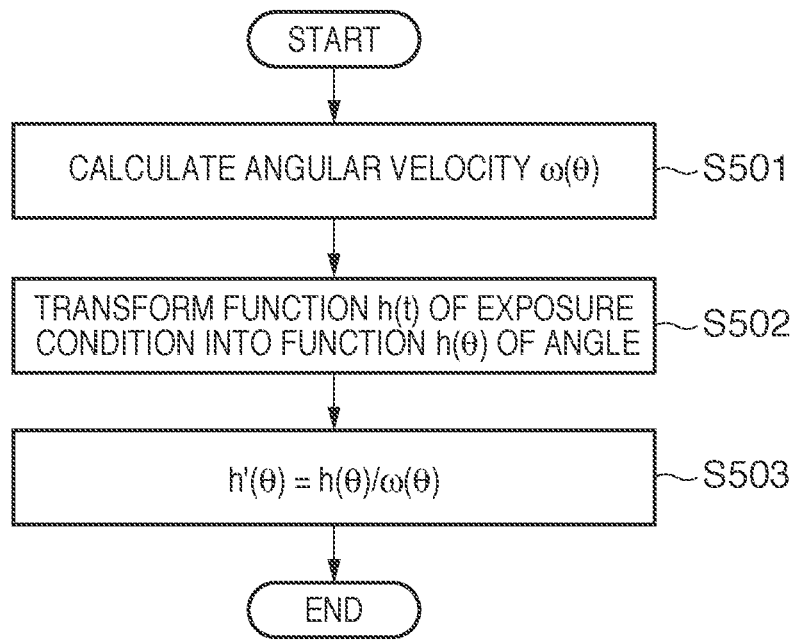
FIG. 6 is a flowchart showing a PSF generation process.

FIG. 6 is a flowchart for explaining the PSF generation process (S404). An angular velocity ω(t) is calculated by differentiating an angle θ by a time based on the input rotary vibration information (S501). By combining the angular velocity ω(t) and θ(t), the angular velocity can be expressed as a function of θ. Let ω(θ) be this function.

Next, a function h(t) is acquired as a function of θ based on the input exposure information and rotary vibration information (S502). Let h(θ) be this function. Then, h'(θ)=h(θ)/ω(θ) is calculated as a PSF based on the acquired information (S503). As described by formula (7), h'(θ) is the PSF on the polar coordinates.

Figure 7:
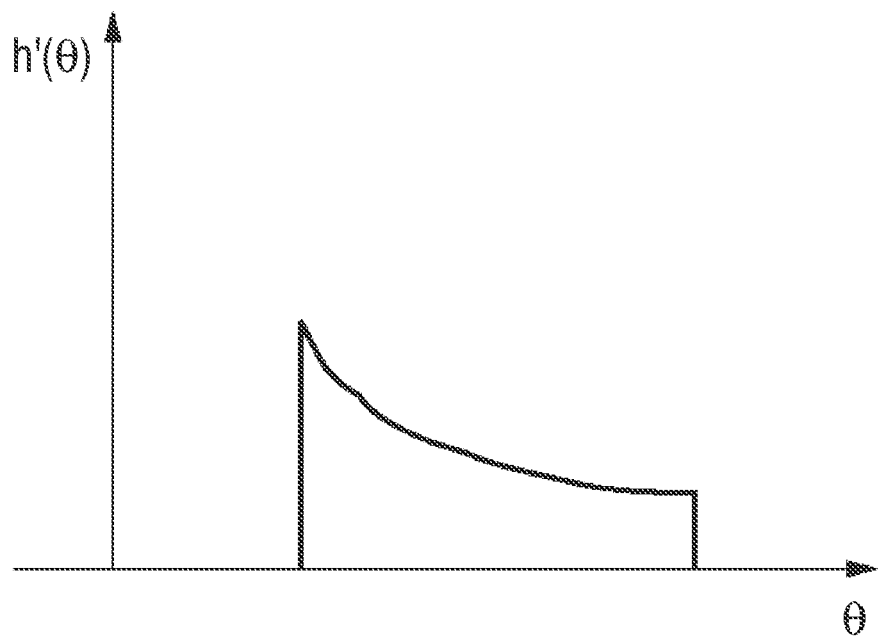
FIG. 7 is a graph showing an example of a PSF in a general rotary motion.

FIG. 7 shows an example of a PSF in a general rotary motion. In FIG. 7, the abscissa plots the angles (rad), and the ordinate plots the values of the PSF. Assuming that the opening and closing pattern is given by h(t)=1 for 0≦t≦T and by h(t)=0 for the other case, and an acceleration motion is being made, since ω(θ) increases, the value of h'(θ) as the PSF decreases.

●Deconvolution

The transformation of formula (8) onto the frequency space yields:

$$I_{blur}(f,\rho)=1/T \cdot H'(f,\rho)I(f,\rho) \quad (9)$$

where f is a variable corresponding to the frequency transformation of r, and

ρ is a variable corresponding to the frequency transformation of Θ.

Since H' (f, ρ) is given, when $I_{blur}$(f, ρ) is divided by H'(f, ρ) on the frequency space, I(f, ρ) is calculated in principle. However, this poses a problem, and the following description will be made under the assumption that ω(θ) is constant in consideration of a vibration due to an equi-angular velocity motion.

Figure 8A:
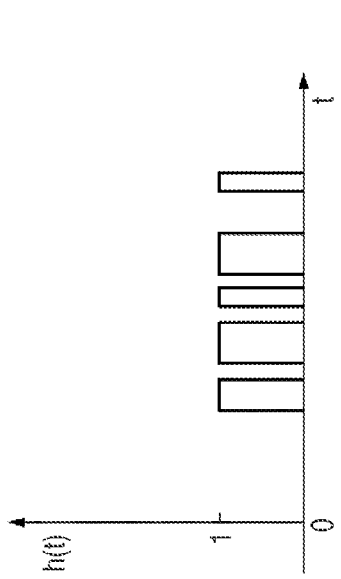
FIGS. 8A and 8B are graphs showing the shape and frequency characteristics of a PSF in case of h(t)=1 when $0 \leq t \leq T$ as a normal exposure condition and h(t)=0 for the other case.
Figure 8B:
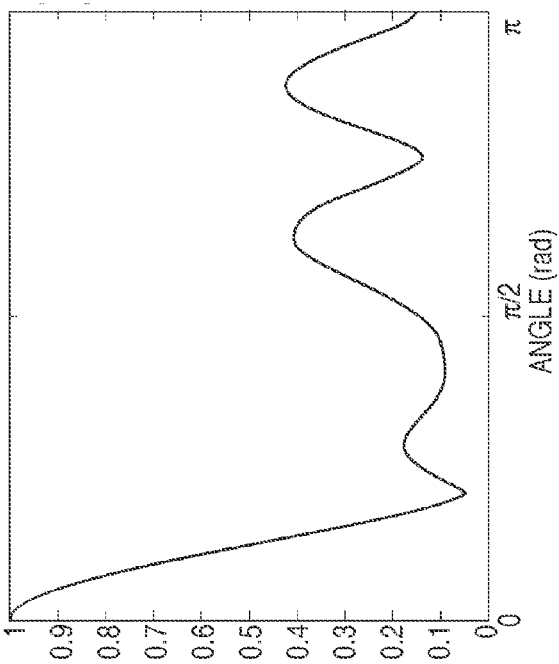

FIG. 8A shows the shape of a PSF when h(t)=1 for 0≦t≦T as a normal exposure condition and h(t)=0 for the other case (which shape defines not a fluttered shutter but a shutter that is continuously open during an exposure period). FIG. 8B shows the frequency characteristics of the PSF shown in FIG. 8A. In FIG. 8A, the abscissa plots the angles (rad), and the ordinate plots the values of the PSF. In FIG. 8B, the abscissa plots the angles (rad), and the ordinate plots the absolute values of H'(f, ρ).

Referring to FIG. 8B, frequencies having an absolute value=0 periodically appear. This represents a loss of information corresponding to that frequency. When deconvolution is applied in such a state, waveforms appear in correspondence with the information-lost frequencies. Hence, coded exposure is made to prevent occurrence of the information-lost frequencies. In other words, in order to prevent occurrence of frequencies having a PSF absolute value=0, the opening and closing timings and open (or close) durations are randomly controlled during the exposure period, thus attaining the fluttered shutter.

Figure 9A:
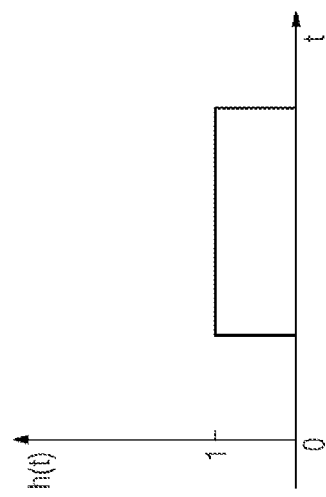
FIGS. 9A and 9B are graphs showing the shape and frequency characteristics of a PSF after coded exposure.
Figure 9B:
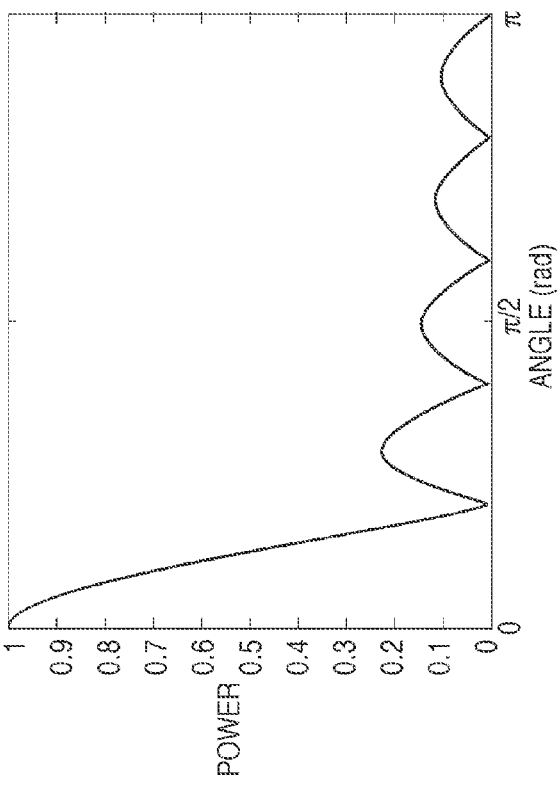

FIG. 9A shows the shape of a PSF after coded exposure, and FIG. 9B shows the frequency characteristics of the PSF shown in FIG. 9A. After coded exposure, since no information-lost frequencies appear, as shown in FIG. 9B, perfect deconvolution can be theoretically attained by dividing $I_{blur}$ (f, ρ) by H' (f, ρ).

Figure 10A:
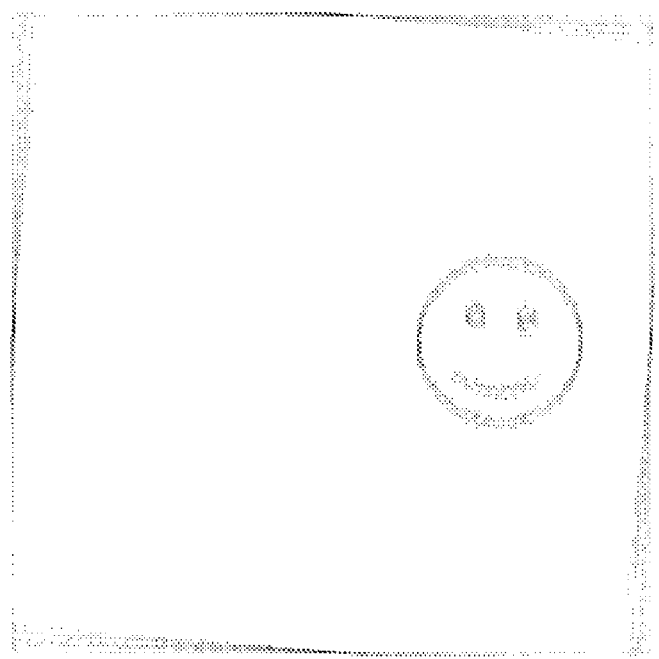
FIGS. 10A and 10B are views showing an image blurred by a rotary vibration, and that in which blur due to a rotary vibration is corrected.
Figure 10B:
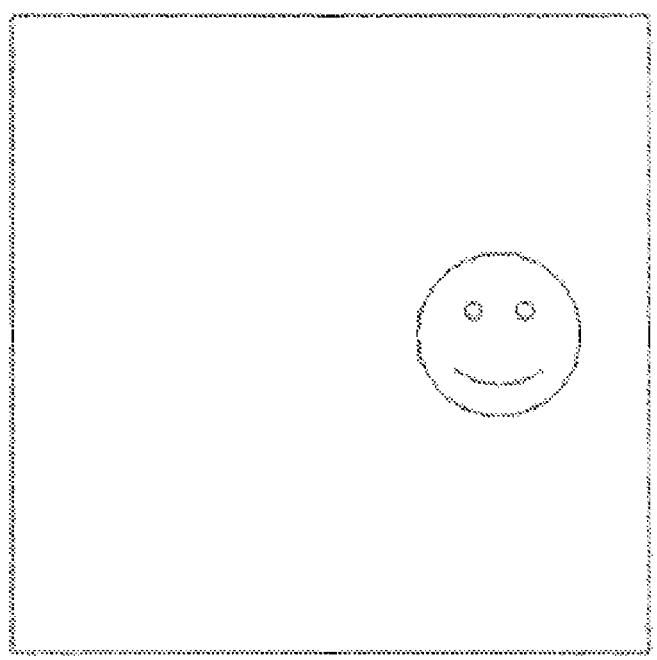

FIG. 10A shows an image (simulation) blurred by a rotary vibration, and FIG. 10B shows an image in which blur due to the rotary vibration is corrected.

In this manner, an image in which blur due to a rotary vibration is corrected can be obtained from image capture data for one image using the rotary vibration information, the opening and closing pattern of the fluttered shutter, mutual transformations between the real space and polar coordinate space, and deconvolution. Also, as can be seen from the above description, information required for the correction process of blur due to a rotary vibration includes the opening and closing pattern, vibration information, and a blurred image due to a vibration generated by additionally synthesizing images according to the opening and closing pattern.

[Correction of Exposure Amount]

Figure 11A:
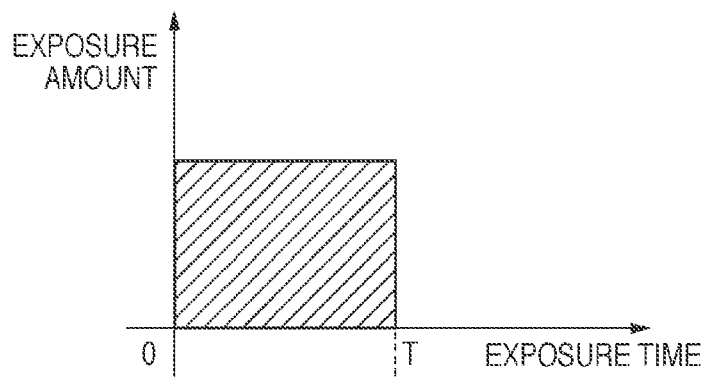
FIGS. 11A to 11C are views for explaining exposure by a fluttered shutter.
Figure 11B:
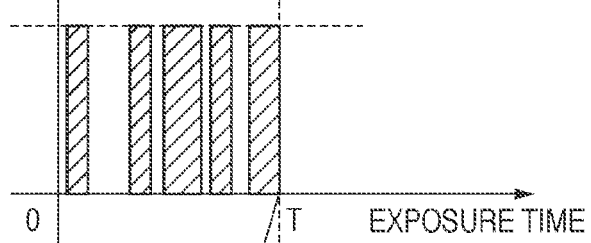
Figure 11C:
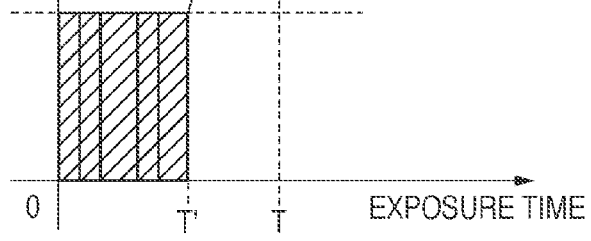

FIGS. 11A to 11C are views for explaining exposure using the fluttered shutter. FIG. 11A shows a state in which a shutter is open for an exposure time that can assure proper exposure (proper exposure time). FIG. 11B shows a state in which the fluttered shutter is applied to the period of the proper exposure time. When the shutter is opened and closed based on the fluttered shutter, the period of the proper exposure time includes non-exposure periods. Therefore, an exposure amount (an integral value of exposure amounts during exposure periods) based on the fluttered shutter is lower than that obtained when the shutter is open for the proper exposure time, resulting in a dark captured image, as shown in FIG. 11C.

Figure 12A:
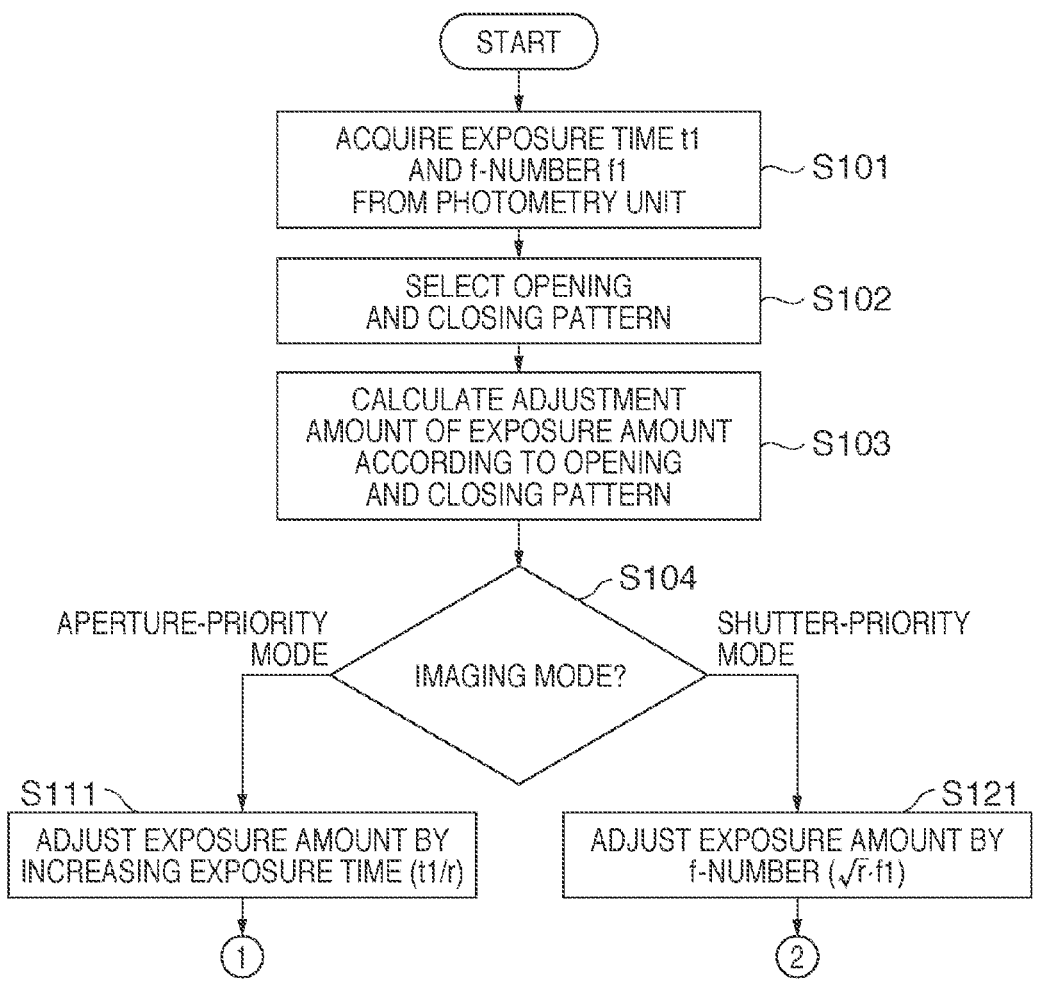
FIGS. 12A and 12B are flowcharts for explaining exposure amount adjustment by an exposure condition generator.
Figure 12B:
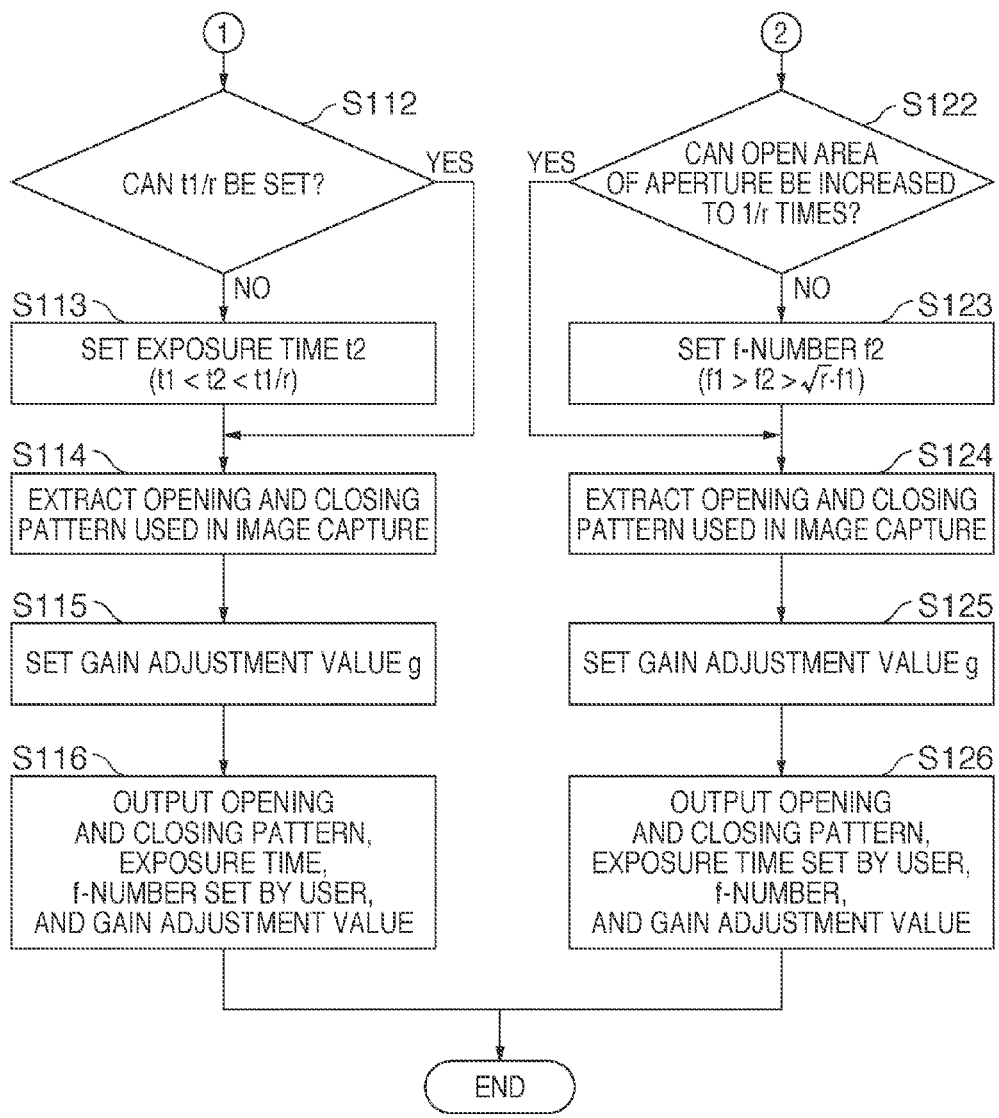

FIGS. 12A and 12B are flowcharts for explaining exposure amount adjustment by the exposure condition generator 427. The exposure condition generator 427 acquires an exposure time t1 and the f number f1 from the photometry unit 414 (S101). The exposure time t1 and f-number f1 respectively indicate a proper exposure time and f-number (to be referred to as a proper f-number hereinafter), at which proper exposure can be obtained when the shutter is continuously open.

The exposure condition generator 427 randomly selects one opening and closing pattern used in image capture from a list of a plurality of shutter opening and closing patterns having no periodicity (S102). Note that the list of opening and closing patterns is stored in, for example, a nonvolatile memory such as an internal ROM of the CPU 402.

FIG. 13 is a table for explaining an example of the list of opening and closing patterns. In the list, IDs corresponding to the opening and closing patterns and open ratios indicating ratios of shutter open times upon application of the opening and closing patterns are registered in association with the respective opening and closing patterns. A value "1" of the opening and closing pattern indicates "shutter open", and a value "0" indicates "shutter close".

In the list, patterns for a time sufficiently longer than an exposure time used in general image capture are registered as the opening and closing patterns. Note that designing of a pattern having no periodicity may use, for example, a pseudo random number generation method such as a Mersenne twister which is known to have a very long period. Then, a generated random number is verified to have no periodicity, and is registered in the list as an opening and closing pattern. Of course, pseudo random numbers need not be used in design of opening and closing patterns, and the finally generated opening and closing patterns need only have no periodicity. The periodicity is verified by frequency-transforming a PSF of an opening and closing pattern, and checking whether or not an absolute value of H'(f, ρ) assumes zero.

The exposure condition generator 427 calculates an adjustment amount of an exposure amount according to the selected opening and closing pattern (S103). For example, when an opening and closing pattern having an open ratio=0.5 is selected from the list shown in FIG. 13, an exposure amount decreases to 0.5 times of that obtained when the shutter is continuously open. In this case, in order to obtain proper exposure, adjustment to double the exposure amount is required. Likewise, when a pattern having an open ratio=0.7 is selected, adjustment to multiply the exposure amount by 1.43 (=1/0.7) is required. That is, the reciprocal of the open ratio of the selected opening and closing pattern is an adjustment amount of an exposure amount.

Next, the exposure condition generator 427 branches processes according to imaging modes (S104). In an aperture-priority mode in which the user sets the f-number (an aperture value), the process advances to step S111; in a shutter-priority mode in which the user sets a shutter speed, the process advances to step S121.

In the aperture-priority mode, since the user sets the f-number, the exposure condition generator 427 adjusts an exposure amount by adjusting an exposure time or gain. However, adjustment of the exposure amount by adjusting the gain often increases noise. Hence, the exposure condition generator 427 adjusts the exposure amount by increasing an exposure time as much as possible (S111). For example, letting t1 be a proper exposure time, and r be an open ratio of an opening and closing pattern, the exposure condition generator 427 sets t1/r as an exposure time (for example, when r=0.5, an exposure time is 2×t1).

The exposure condition generator 427 then determines whether or not t1/r can be set (S112). That is, the exposure amount cannot often be adjusted by increasing only the exposure time (for example, when the exposure time can only be set step by step or when t1/r exceeds a maximum settable exposure time). In this case, the exposure condition generator 427 sets an exposure time t2 (t1<t2<t1/r) as a settable exposure time which assumes a value closest to t1/r (S113). Then, the exposure condition generator 427 extracts an opening and closing pattern for a time corresponding to t1/r or t2 from a random position of the selected opening and closing pattern as that used in image capture (S114).

FIG. 14 is a graph for explaining adjustment of an exposure amount in the aperture-priority mode. As shown in FIG. 14, when an exposure time after adjustment is t2, it can be adjusted to proper exposure by compensating for a deficient exposure amount when respective pixel values after image capture are multiplied by (t1/r/t2) by gain adjustment. However, the open ratio r acquired from the list does not always match an open ratio r' of the extracted opening and closing pattern. Hence, the exposure condition generator 427 calculates the open ratio r' of the extracted opening and closing pattern, and sets (t1/r'/t2) as a gain adjustment value g (S115). Then, the exposure condition generator 427 notifies the shutter controller 415, image stabilization unit 428, CPU 402, and the like of the extracted opening and closing pattern, exposure time t1/r or t2, f-number f set by the user, and gain adjustment value g (S116). In this way, an operation of image capture is done.

On the other hand, in the shutter-priority mode, since the user sets a shutter speed, the exposure condition generator 427 adjusts an exposure amount by adjusting an f-number or gain. However, adjustment of the exposure amount by adjusting the gain often increases noise. Hence, the exposure condition generator 427 adjusts the exposure amount by adjusting the f-number as much as possible (S121). For example, letting f1 be a proper f-number, and r be an open ratio of an opening and closing pattern, the exposure condition generator 427 controls to increase an incoming light amount by increasing an open area of the stop to 1/r times. That is, the exposure condition generator 427 sets √r×f1 as f-number (for example, when r=0.5, the f-number is √0.5×f1).

Next, the exposure condition generator 427 determines whether or not the open area of the aperture can be increased to 1/r times (S122). That is, the exposure amount cannot often be adjusted by adjusting only the f-number (for example, when the f-number can only be set step by step or when the f-number that exceeds an open aperture cannot be set). In this case, the exposure condition generator 427 sets the f-number f2 (f1>f2>√r·f1) as the settable f-number which defines an open area closest to √r·f1 (S123). Then, the exposure condition generator 427 extracts an opening and closing pattern for a time corresponding to the shutter speed (exposure time) set by the user from a random position of the selected opening and closing pattern as that used in image capture (S124).

FIG. 15 is a graph for explaining adjustment of an exposure amount in the shutter-priority mode. As shown in FIG. 15, when the f-number after adjustment is f2, an exposure amount can be adjusted to proper exposure by compensating for a deficient exposure amount when respective pixel values after image capture are multiplied by (f2/(√r·f1)) by gain adjustment. However, as in the aperture-priority mode, the open ratio r acquired from the list does not always match an open ratio r' of the extracted opening and closing pattern. Hence, the exposure condition generator 427 calculates the open ratio r' of the extracted opening and closing pattern, and sets (f2/(√r'·f1)) as a gain adjustment value g (S125). Then, the exposure condition generator 427 notifies the shutter controller 415, image stabilization unit 428, and CPU 402 of the extracted opening and closing pattern, f-number √r·f1 or f2, exposure time t set by the user, and gain adjustment value g (S126). In this way, an operation of image capture is done.

When the coded exposure process is applied to image capture data, the exposure amount of which is adjusted in this way, a proper exposure image in which blur due to a vibration is corrected can be obtained. That is, exposure amount deficiency that poses a problem upon correcting blur by coded exposure is compensated for according to the opening and closing pattern and imaging mode, thus obtaining a proper exposure captured image. In addition, the gain adjustment is minimized to suppress an increase in noise (image quality degradation).

Second Embodiment

Image processing according to the second embodiment of the present invention will be described hereinafter. Note that the same reference numerals in the second embodiment denote the same components as those in the first embodiment, and a detailed description thereof will not be repeated.

The first embodiment has exemplified the case in which one of opening and closing patterns registered in the list is selected and is used in image capture. The second embodiment will explain a method of generating an opening and closing pattern at the time of image capture.

Figure 16A:
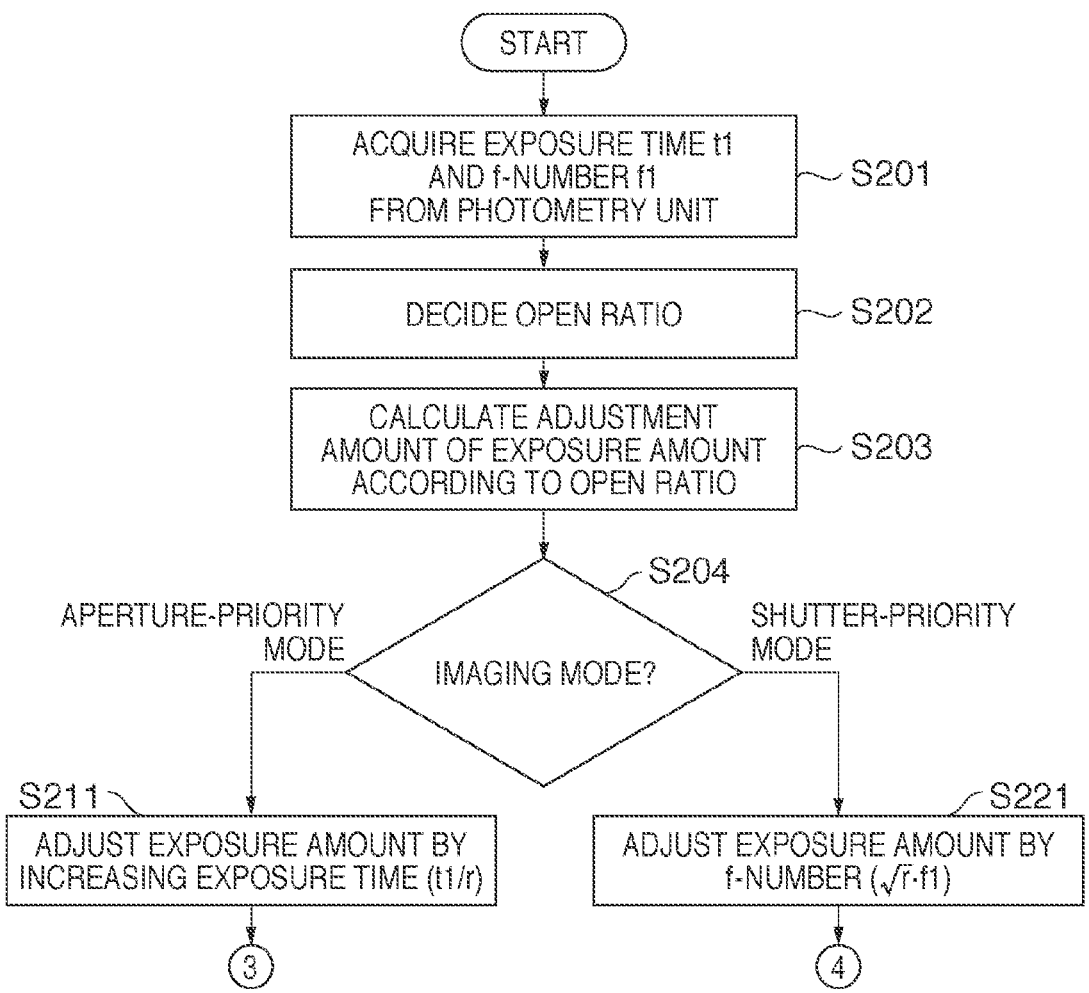
FIGS. 16A and 16B are flowcharts for explaining exposure amount adjustment by an exposure condition generator according to the second embodiment.
Figure 16B:
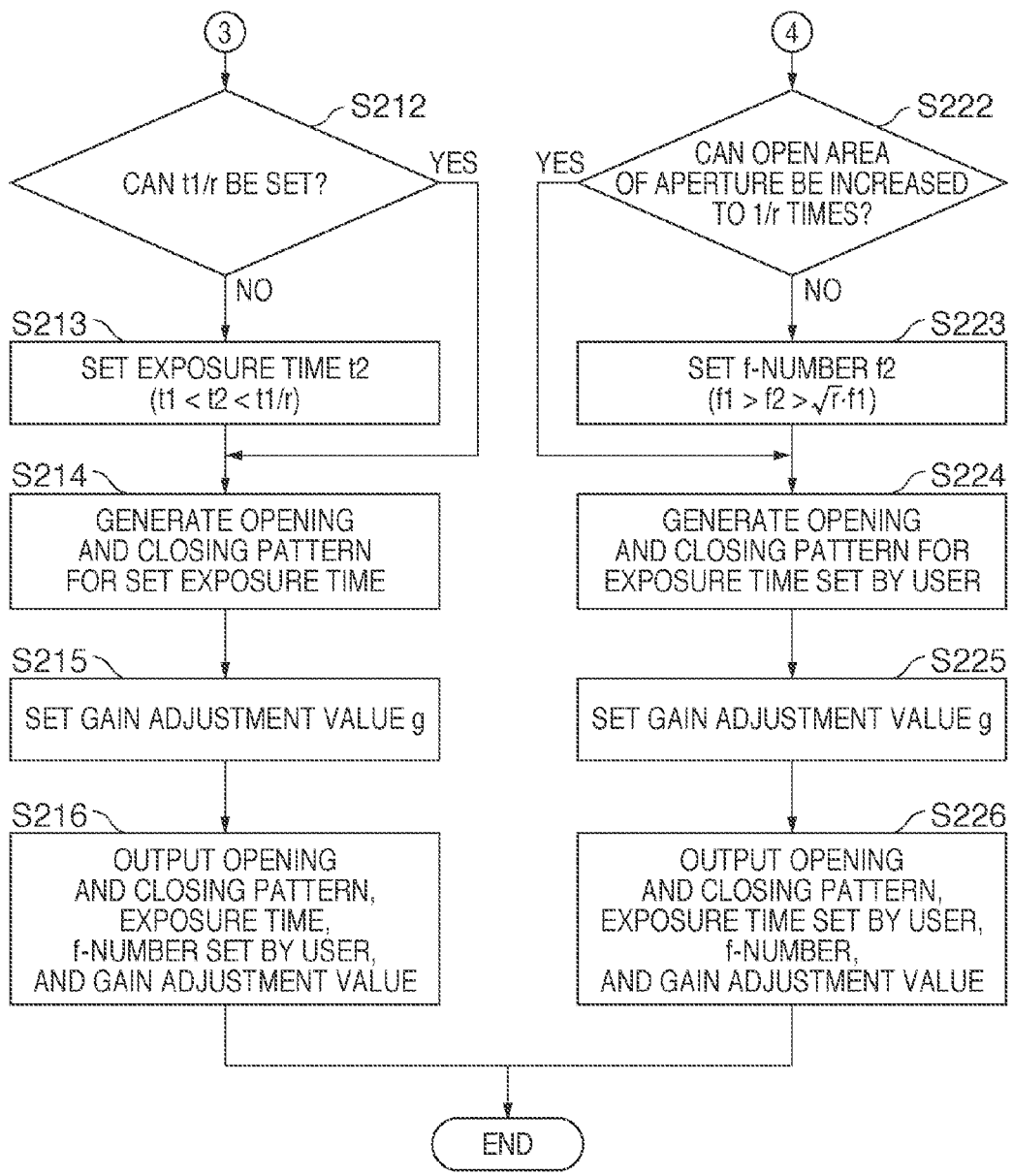

FIGS. 16A and 16B are flowcharts for explaining adjustment of an exposure amount by an exposure condition generator 427 according to the second embodiment. The exposure condition generator 427 acquires a proper exposure time t1 and proper f-number f1 from a photometry unit 414 (S201), and decides an open ratio r indicating a ratio of shutter open periods in an opening and closing pattern (S202). The exposure condition generator 427 decides the open ratio r according to, for example, imaging conditions including an imaging mode, the proper exposure time, and the proper f-number, or an object.

For example, upon capturing a portrait photo using a portrait mode, a large number of flat image regions appear in a captured image, and an image including many low-frequency components is often obtained. In this case, when a random pattern having response values over a broad frequency range is used as an opening and closing pattern, image capture data has unnecessary frequency components, and noise often stands out in a vibration-corrected image. Conversely, when a pattern having many low-frequency components is used as an opening and closing pattern, noise can be suppressed.

In general, when an open ratio is equal to 0.5, a pattern has a largest number of high-frequency components, and a pattern has a power on its lower-frequency side with increasing open ratio to have an open ratio equal to 0.5 as a boundary. Hence, when a captured image including many low-frequency components is likely to be obtained like in image capture in the portrait mode, a relatively high open ratio is set to define an opening and closing pattern having frequency characteristics according to the imaging mode. Of course, since a high open ratio is set, a decrease in exposure amount due to coded exposure can also be suppressed.

Next, the exposure condition generator 427 calculates an adjustment amount (1/r) of an exposure amount according to the decided open ratio r (S203). Then, the exposure condition generator 427 branches processes according to imaging modes (S204). In an aperture-priority mode, the process advances to step S211; in a shutter-priority mode, the process advances to step S221.

In the aperture-priority mode, as in steps S111 to S113 of the first embodiment, the exposure condition generator 427 adjusts an exposure time (S211) and determines whether or not an exposure time t1/r after adjustment can be set (S212). If the exposure time after adjustment cannot be set, the exposure condition generator 427 sets an exposure time t2 (t1<t2<t1/r) as a settable exposure time which assumes a value closest to t1/r (S213). The exposure condition generator 427 then generates an opening and closing pattern having a duration of the exposure time t1/r or t2 based on the decided open ratio r (S214).

As shown in FIG. 14, when an exposure time after adjustment is t2, it can be adjusted to proper exposure by compensating for a deficient exposure amount when respective pixel values after image capture are multiplied by (t1/r/t2) by gain adjustment. However, an open ratio r' of an opening and closing pattern generated from, for example, a random number does not always match the decided open ratio r. Hence, the exposure condition generator 427 calculates the open ratio r' of the generated opening and closing pattern, and sets (t1/r'/t2) as a gain adjustment value g (S215). Then, the exposure condition generator 427 notifies the shutter controller 415, image stabilization unit 428, CPU 402, and the like of the generated opening and closing pattern, exposure time t1/r or t2, f-number f set by the user, and gain adjustment value g (S216). In this way, an operation of image capture is done.

On the other hand, in the shutter-priority mode, as in steps S121 to S123 of the first embodiment, the exposure condition generator 427 adjusts an exposure amount using the f-number (S221), and determines whether or not an open area of a stop can be increased to 1/r times (S222). Then, if the open area cannot be increased to 1/r times, the exposure condition generator 427 sets the f-number f2 (f1>f2>√r·f1) as the settable f-number which defines an open area closest to √r·f1 (S223). Then, the exposure condition generator 427 generates an opening and closing pattern having a duration of a shutter time (exposure time) t1 set by the user based on the decided open ratio r (S224).

As shown in FIG. 15, when the f-number after adjustment is f2, an exposure amount can be adjusted to proper exposure by compensating for a deficient exposure amount when respective pixel values after image capture are multiplied by (f2/(√r·f1)) by gain adjustment. However, as in the aperture-priority mode, an open ratio r' of an opening and closing pattern generated from, for example, a random number does not always match the decided open ratio r. Hence, the exposure condition generator 427 calculates the open ratio r' of the generated opening and closing pattern, and sets (f2/(√r'·f1)) as a gain adjustment value (S225). Then, the exposure condition generator 427 notifies the shutter controller 415, image stabilization unit 428, and CPU 402 of the generated opening and closing pattern, f-number f1/r or f2, exposure time t set by the user, and gain adjustment value g (S226). In this way, an operation of image capture is done.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-145825, filed Jun. 18, 2009, which is hereby incorporated by reference herein in its entirety.

What is claimed is:

1. An image processing apparatus for correcting blur of image capture data of an image capturing device by coded exposure processing, the apparatus comprising:

an inputting section configured to input an exposure time and an aperture value, which are set by a photometry unit of the image capturing device according to an object;

an adjustor configured to, based on a ratio of shutter open periods in an opening and closing pattern of a shutter used in the coded exposure processing, adjust the exposure time, the aperture value, and/or a gain adjustment value; and a controller configured to, based on the opening and closing pattern, the exposure time, the aperture value, and/or the gain adjustment value, control image capture by an image capturing unit of the image capturing device.

2. The apparatus according to claim 1, wherein when an aperture-priority mode is set in the image capturing device, the adjustor adjusts the exposure time, and when a shutter-priority mode is set in the image capturing device, the adjustor adjusts the aperture value.

3. The apparatus according to claim 1, further comprising a gain adjustor configured to perform gain adjustment of image capture data captured by the image capturing unit based on the gain adjustment value.

4. The apparatus according to claim 1, further comprising a corrector configured to apply the coded exposure processing to the image capture data based on the opening and closing pattern.

5. The apparatus according to claim 1, wherein the opening and closing pattern of the shutter used in the coded exposure processing is selected out of a plurality of opening and closing patterns.

6. The apparatus according to claim 4, wherein the opening and closing pattern of the shutter used in the coded exposure processing is generated.

7. A method of correcting blur of image capture data of an image capturing device by coded exposure processing, the method comprising using a processor to perform steps comprising:

inputting an exposure time and an aperture value, which are set by a photometry unit of the image capturing device according to an object;

based on a ratio of shutter open periods in an opening and closing pattern of a shutter used in the coded exposure processing, adjusting the exposure time, the aperture value, and/or a gain adjustment value; and based on the opening and closing pattern, the exposure time, the aperture value, and/or the gain adjustment value, controlling image capture by an image capturing unit of the image capturing device.

8. A non-transitory computer-readable medium storing a computer-executable program for causing a computer to perform a method of correcting blur of image capture data of an image capturing device by coded exposure processing, the method comprising the steps of:

inputting an exposure time and an aperture value, which are set by a photometry unit of the image capturing device according to an object;

based on a ratio of shutter open periods in an opening and closing pattern of a shutter used in the coded exposure processing, adjusting the exposure time, the aperture value, and/or a gain adjustment value; and based on the opening and closing pattern, the exposure time, the aperture value, and/or the gain adjustment value, controlling image capture by an image capturing unit of the image capturing device.

* * * * *